US012076744B2

(12) United States Patent
Sakai

(10) Patent No.: US 12,076,744 B2
(45) Date of Patent: Sep. 3, 2024

(54) ASSEMBLY, METHOD FOR USING ASSEMBLY, APPLYING DEVICE, METHOD FOR USING APPLYING DEVICE, METHOD FOR REPLENISHING MATERIAL

(71) Applicant: THREEBOND CO., LTD., Tokyo (JP)

(72) Inventor: Hiroaki Sakai, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 745 days.

(21) Appl. No.: 17/293,031

(22) PCT Filed: Oct. 16, 2019

(86) PCT No.: PCT/JP2019/040705
§ 371 (c)(1),
(2) Date: May 11, 2021

(87) PCT Pub. No.: WO2020/100508
PCT Pub. Date: May 22, 2020

(65) Prior Publication Data

US 2021/0394225 A1 Dec. 23, 2021

(30) Foreign Application Priority Data

Nov. 14, 2018 (JP) ................................ 2018-214040

(51) Int. Cl.
*B05C 11/10* (2006.01)
*F04B 15/02* (2006.01)

(52) U.S. Cl.
CPC .............. *B05C 11/10* (2013.01); *F04B 15/02* (2013.01)

(58) Field of Classification Search
CPC .... B05C 5/00; B05C 5/02; B05C 7/02; B05C 9/08–12; B05C 11/10; B05C 11/1002;
(Continued)

(56) References Cited

U.S. PATENT DOCUMENTS 4,790,456 A * 12/1988 Nakane .................... B67D 7/62 222/386
7,510,103 B2 * 3/2009 Ikushima .............. F04B 7/0015 222/506

(Continued)

FOREIGN PATENT DOCUMENTS

DE 4211370 A1 * 10/1993 ......... B05C 11/1042
JP 2001-207953 A 8/2001

(Continued)

OTHER PUBLICATIONS

PCT, International Search Report for the corresponding patent application No. PCT/JP2019/040705, dated Dec. 17, 2019, with English translation.

(Continued)

*Primary Examiner* — William P Fletcher, III
(74) *Attorney, Agent, or Firm* — Lucas & Mercanti, LLP

(57) ABSTRACT

An assembly is used for an applying device having a first pressurizing member that can pressurize a viscous material stored in a first container, and a second container having the viscous material stored, the second container being relatively approachable and separatable with respect to the first pressurizing member. The first pressurizing member includes a first contact unit contactable with the second container and a first passage through which the viscous material stored in the first container is circulatable to the second container. The second container includes a second contact unit contactable with the first contact unit, and a second passage provided on the second contact unit, the second passage being interrupted from the first passage when the first contact unit is brought into contact with the second contact unit, the second passage communicating with the first passage when the first contact unit is separated from the second contact unit.

10 Claims, 6 Drawing Sheets

(58) Field of Classification Search
CPC ........ B05C 11/101; B05C 11/11; F04B 15/02; B05D 1/02
USPC ......... 118/690, 692–694, 300, 317; 427/230, 427/238, 294, 421.1, 427.7, 427.5
See application file for complete search history.

(56) References Cited

U.S. PATENT DOCUMENTS

| | | | | |
|---|---|---|---|---|
| 8,453,886 | B2 * | 6/2013 | Ikushima | F04B 23/02 222/64 |
| 11,481,164 | B2 * | 10/2022 | Phoboonme | G06N 20/00 |
| 2013/0056491 | A1 * | 3/2013 | Suzuki | B05C 11/10 222/95 |
| 2021/0046502 | A1 * | 2/2021 | Suzuki | B05C 5/02 |

FOREIGN PATENT DOCUMENTS

| | | | | | |
|---|---|---|---|---|---|
| JP | 2013-163152 | A | | 8/2013 | |
| JP | 2014122586 | A | * | 7/2014 | B05C 11/1002 |
| JP | 2018-127905 | A | | 8/2018 | |
| JP | 2019-183749 | A | | 10/2019 | |
| WO | WO-2006000322 | A1 | * | 1/2006 | B05C 11/1002 |
| WO | WO-2013118372 | A1 | * | 8/2013 | B05C 11/1002 |

OTHER PUBLICATIONS

PCT, Written Opinion of the International Searching Authority for the corresponding patent application No. PCT/JP2019/040705, dated Dec. 17, 2019 (English translation not available).

EPO, Extended European Search Report for the corresponding European patent application No. 19884722.0, dated Jul. 6, 2022.

* cited by examiner

ASSEMBLY, METHOD FOR USING ASSEMBLY, APPLYING DEVICE, METHOD FOR USING APPLYING DEVICE, METHOD FOR REPLENISHING MATERIAL

CROSS REFERENCE TO RELATED APPLICATION

This Application is a 371 of PCT/JP2019/040705 filed on Oct. 16, 2019 which, in turn, claimed the priority of Japanese Patent Application No. 2018-214040 filed on Nov. 14, 2018, both applications are incorporated herein by reference.

TECHNICAL FIELD

The present invention relates to an assembly, a method for using an assembly, an applying device including an assembly, a method for using an applying device, and a method for replenishing a material.

BACKGROUND ART

In manufacturing processes for various machines including automobiles, industrial machines, and the like, in applying viscous materials including grease, adhesives, sealing agents, and the like, a device that discharges a certain amount of a viscous material from the nozzle of a dispenser and applies the viscous material on a predetermined site is used. Since the circulation resistance of the viscous material to pipes in the device is large, the viscous material is pressurized by a piston, a plunger, or the like, and extruded to the pipe.

In the case in which the viscous material is extruded by the piston, a plunger, or the like as described above, when a tank becomes empty, the piston and the like have to be retreated from the tank, which is not inefficient. To such a problem, a technique is disclosed in which a main tank and a buffer tank are prepared and a communication passage to the buffer tank is provided on a piston that pressurizes a viscous material in the main tank (see Patent Literature 1).

CITATION LIST

Patent Literatures

Patent Literature 1: JP 2013-163152 A

SUMMARY OF INVENTION

In Patent Literature 1, although an on-off valve that switches between the circulation and interruption of a viscous material between a first container and a second container is disclosed, the detailed structure of the on-off valve is not described. The present inventor investigates an assembly corresponding to an on-off valve that can switch between the circulation and interruption of a viscous material between a first container such as a main tank and the like and a second container such as a buffer tank and the like depending on the case.

Therefore, an object of the present invention is to provide an assembly that can switch between the circulation and interruption of a viscous material between a main tank (a first container) and a buffer tank (a second container), a method for using an assembly, an applying device including the assembly, and a method for using an applying device.

An assembly according to an aspect of the present invention is used for an applying device having a first pressurizing member and a second container. The first pressurizing member is configured in which a viscous material stored in a first container can be pressurized. The second container is configured storing the material and being relatively approachable and separatable with respect to the first pressurizing member. The first pressurizing member includes a first contact unit contactable with the second container and a first passage through which the material stored in the first container is circulatable to the second container. The second container includes a second contact unit and a second passage. The second contact unit is configured being contactable to the first contact unit. The second passage is provided on the second contact unit, the second passage being interrupted from the first passage when the first contact unit is brought into contact with the second contact unit, the second passage communicating with the first passage when the first contact unit is separated from the second contact unit. Furthermore, an aspect according to the present invention includes a method for using the assembly, an applying device including the assembly, and a method for using an applying device. Furthermore, an aspect according to the present invention includes a method for replenishing a material in a first container while the material stored in a second container is supplied to a discharging unit enabling discharging the material stored in the first container and the second container using a second pressurizing member enabling pressurization of the material stored in the second container.

DESCRIPTION OF EMBODIMENTS

Figure 1:
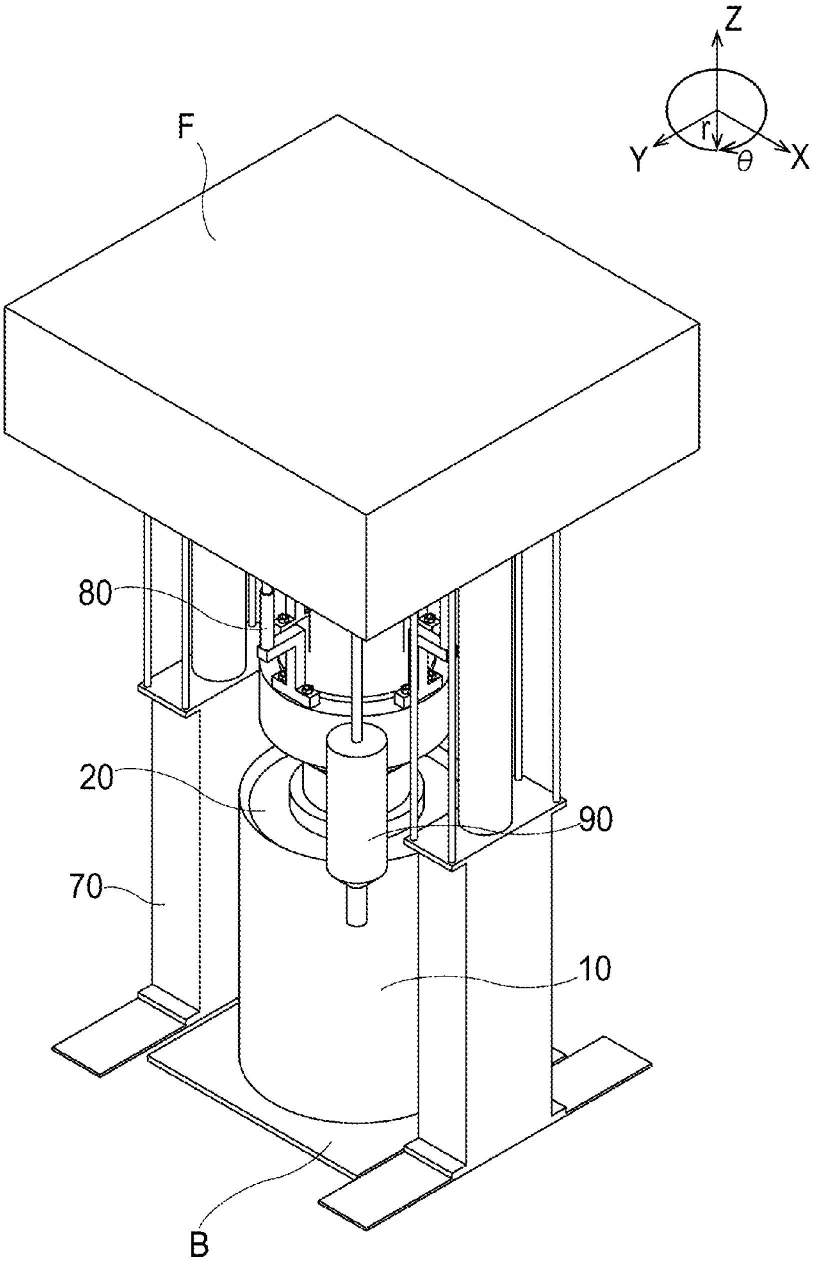
FIG. 1 is a perspective view showing an applying device according to an embodiment of the present invention.

In the following, referring to the accompanying drawings, an embodiment of the present invention will be described. FIGS. 1 to 4 are views serving for the explanation of a first pressurizing member 20 and a second container 30 constituting an applying device 100 and an assembly according to an embodiment of the present invention. Note that in the drawings, in the explanation of the applying device 100, a rectangular coordinate system and a cylindrical coordinate system are shown in the drawings. A direction in parallel with a mounting surface M on which the applying device 100 is mounted is defined as a planar direction XY. Furthermore, the height direction of the applying device 100 is defined as a height direction Z. Furthermore, in the explanation of the members constituting the applying device 100, the radial direction is defined as a radial direction r, and the circumferential direction, the angle direction, or the rotation direction is defined as a circumferential direction θ.

The applying device 100 according to the present embodiment is used in applying grease, adhesives, liquid gaskets such as FIPG (Formed-In-Place gasket), sealing agents, and other viscous materials on a target in manufacturing processes for machines such as automobiles and industrial machines, maintenance, and the like.

In the viscous material in the present embodiment, the viscosity is preferably in the range of 20 to 1,000 Pa·s. Furthermore, the thixotropic ratio of the viscous material is preferably in the range of 1.0 to 5. Furthermore, the viscous material may be materials taking a curing form of a resin including moisture curing, thermosetting, photo-curing, and the like. Furthermore, the viscous material can be resins including silicone, epoxy, (meta)acrylic, and the like.

Figure 2:
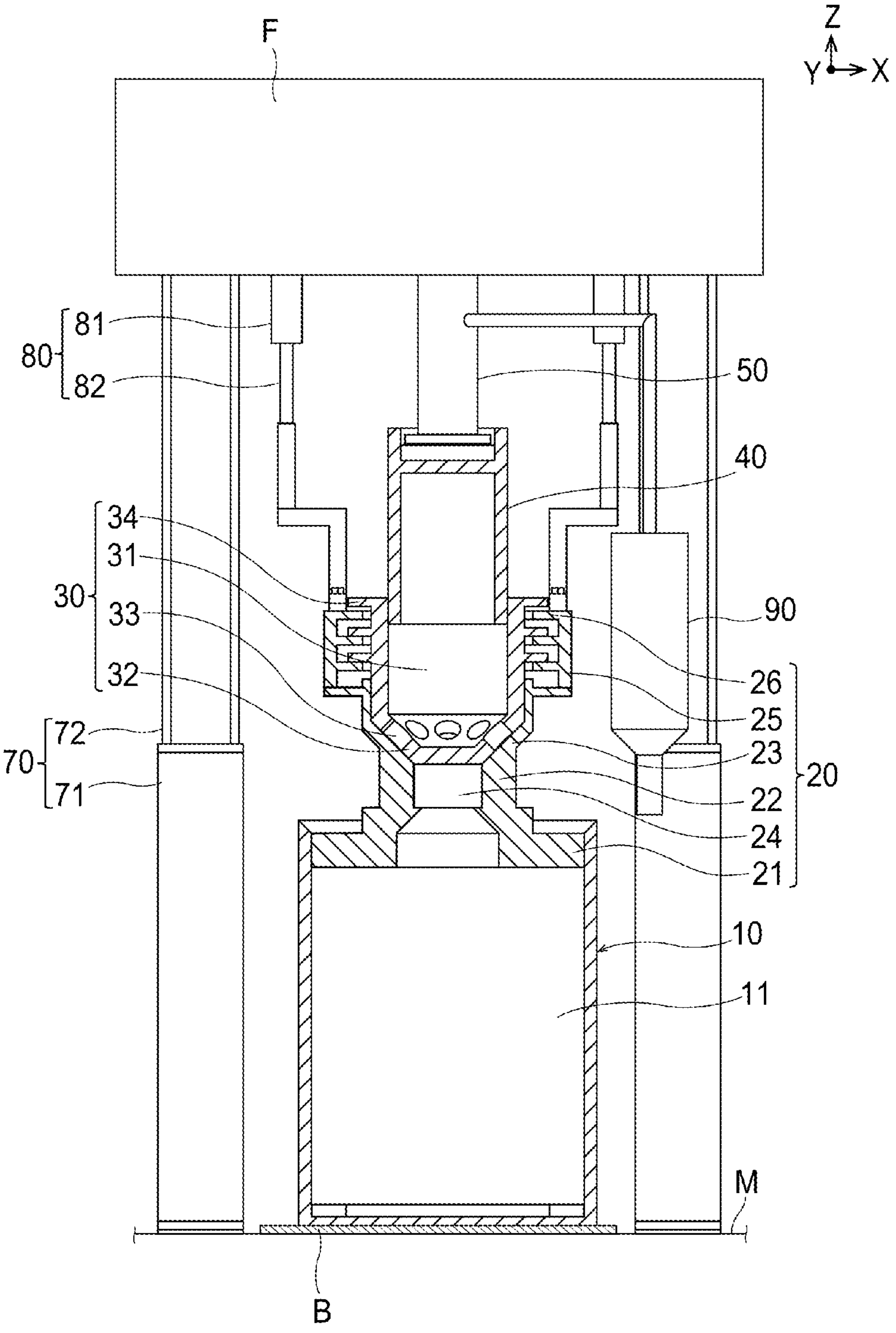
FIG. 2 is a partial cross sectional view seen the applying device in FIG. 1 from the front.

As shown in FIGS. 1 and 2, the applying device 100 has a first container 10, a first pressurizing member 20, a second container 30, a second pressurizing member 40, a pump 50, a first drive unit 60, a second drive unit 70, a third drive unit 80, a dispenser 90 (corresponding to a discharging unit). A component that is a combination of the first pressurizing member 20 and the second container 30 is referred to as an assembly A in the present specification. The first container 10 is called a main tank, and the first pressurizing member 20 is sometimes called a main piston. The second container 30 is called a sub tank or the buffer tank, and the second pressurizing member 40 is sometimes called a buffer piston. In the following, the detail will be described.

(First Container)

As shown in FIG. 2, the first container 10 includes a storage space 11 in which a viscous material S is stored, and is configured to have a semi-enclosed space. The first container 10 is configured in which a pressurizing unit 21, described later, is configured to be insertable into the storage space 11 in the height direction Z, and the storage space 11 is configured so as not to be an enclosed state when the pressurizing unit 21 is separately located above the first container 10. The first container 10 can be detachably mounted on a plate-shaped member including a base plate B and the like, or can be configured integrally with the base plate B. The capacity of the first container 10 is optional, and can be appropriately set depending on use conditions and the like. In the present embodiment, as an example, a size of approximately a pail that can accommodate a bag made of a synthetic resin or the like with a capacity of 18 to 20 liters or so accommodating the viscous material S is configured. However, the capacity of the storage space 11 may be other than one described above. The viscous material S may be directly injected into the first container 10 that is not enclosed when the pressurizing unit 21 is separated upward from the first container 10 and positioned, or the viscous material S may be contained in the first container 10 with the bag containing the viscous material S and the upper part and the like of the bag may be opened. In the present embodiment, the first container 10 is formed in a cylindrical shape that is in a nearly perfect circular shape in a planar view. However, specific shapes are not limited to the one above as long as the viscous material S can be accommodated in a predetermined amount. The first container may be a circular shape that is not a perfect circle in a planar view other than the one described above, or may be configured of a polygonal polyhedron.

(First Pressurizing Member)

Figure 6:
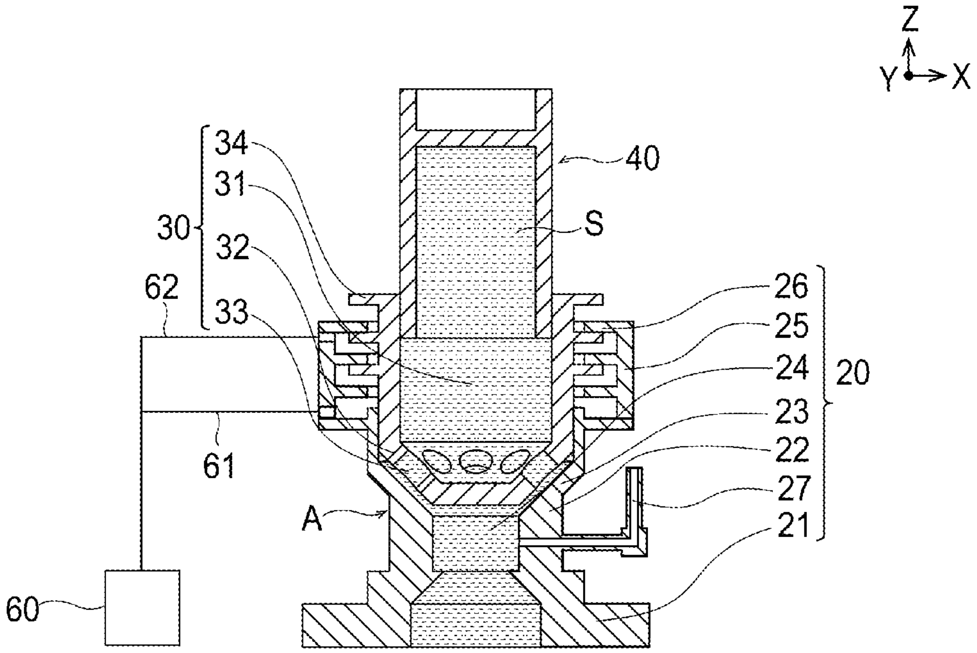
FIG. 6 is a view showing an occasion when the second container is separated from a first pressurizing member and a material is circulated from a first container to a dispenser (a discharging unit) through the second container.

The first pressurizing member 20 is configured in which the viscous material S stored in the first container 10 can be pressurized. As shown in FIGS. 2, 6, and the like, the first pressurizing member 20 includes a pressurizing unit 21, a vertical unit 22, a first contact unit 23, a first passage 24, an external wall 25, a third contact unit 26, and a discharge unit 27. Note that the discharge unit 27 is omitted in FIG. 2 for convenience of illustration.

The pressurizing unit 21 is formed on the first container 10 side when the first pressurizing member 20 is disposed (attached) on the first container 10. The pressurizing unit 21 is configured in the same cross sectional form (in the present embodiment, a nearly circular shape) as the storage space 11 of the first container 10 such that the pressurizing unit 21 can enter the storage space 11 of the first container 10. The pressurizing unit 21 is configured slidably to the first container 10 in the storage space 11. On the pressurizing unit 21, a sealing member including an O-ring and the like can be installed on the boundary of the first container 10 in order to fluid-tightly pressurize the storage space 11. The pressurizing unit 21 is provided with a part of the first passage 24 through which the viscous material S circulates from the first container 10 to the second container 30 in the internal space.

The first pressurizing member 20 is disposed between the first container 10 and the second container such that the viscous material S can circulate from the first container 10 to the second container 30. The first container 10, the first pressurizing member 20, the second container 30, the second pressurizing member 40, and the pump 50 are disposed side by side in the height direction Z in the installed state.

The vertical unit 22 is formed continuing to the pressurizing unit 21. The vertical unit 22 is configured so as to extend in the direction in which the viscous material S flows. The vertical unit 22, similarly to the pressurizing unit 21, is provided with a part of the first passage 24 through which the viscous material S circulates from the first container 10 to the second container 30 in the internal space.

The first contact unit 23 is configured being contactable to the second contact unit 32 of the second container 30. The first contact unit 23 is formed continuing from the vertical unit 22. The first contact unit 23, similarly to the pressurizing unit 21 and the like, is provided with the first passage 24 through which the viscous material S circulates from the first container 10 to the second container 30 at the first pressurizing member 20 in the internal space. The first contact unit 23 is configured being inclined like an inclination unit having a cross sectional area gradually increasing more than in the vertical unit 22. In the present embodiment, the first contact unit 23 is configured such that the cross sectional form increases as being separated from the vertical unit 22 in the height direction Z like the side surface of a truncated cone.

The first passage 24 is configured in which the viscous material S stored in the storage space 11 of the first container 10 can circulate to the second container 30. The first passage 24 is configured being provided in the internal spaces of the pressurizing unit 21, the vertical unit 22, and the first contact unit 23 as described above.

The external wall 25 is provided with a space in its inside for circulating a pressurization medium that moves the second container 30 to the first pressurizing member 20. As shown in FIG. 2, and the like, the external wall 25 is formed continuing to the first contact unit 23. Furthermore, as shown in FIGS. 5 to 9, the external wall 25 is configured being connectable to supply ports 61 and 62 of the first drive unit 60, described later.

The third contact unit 26 is configured as a regulating unit that regulates the range in which the second container 30 moves. As shown in FIG. 2, the third contact unit 26 is configured in a plurality of units on the external wall 25 at predetermined spacings. The range in which the second container 30 moves is defined corresponding to the spacing of the third contact unit 26. The specific number or the like of the third contact unit 26 is not limited to the number shown in FIGS. 2, 6, and the like as long as the range in which the second container 30 moves can be regulated.

The discharge unit 27 is configured in which air and the like can be discharged from the viscous material S disposed in the first container 10 in charging the viscous material S to the first container 10. The discharge unit 27 includes a valve structure that discharges the air and the like. The discharge unit 27 discharges the air and the like included in the viscous material S disposed in the storage space 11 of the first container 10 by mounting the pressurizing unit 21 of the first pressurizing member 20 on the viscous material S charged to the first container 10 and opening the valve before the pressurization of the first container 10 is started.

(Second Container)

The second container 30 is configured to store the viscous material S and configured being relatively approachable and separatable to the first pressurizing member 20. As shown in FIG. 2, the second container 30 includes a storage space 31, a second contact unit 32, a second passage 33, and a fourth contact unit 34. The first pressurizing member 20 and the second container 30 are configured being approachable and separatable in the height direction Z corresponding to the vertical direction in the state in which the applying device 100 is mounted on the mounting surface M corresponding to the horizontal plane. Note that in the present specification, the storage space 11 is also referred to as a first space, and the storage space 31 is also referred to as a second space.

The second container 30 is formed such that the outer side surface is brought into contact with the inner surfaces of the first contact unit 23, the external wall 25, and the third contact unit 26 so that at least a part can be accommodated in the internal space formed by the first contact unit 23, the external wall 25, and the third contact unit 26 of the first pressurizing member 20. The second container 30 is formed to have a semi-enclosed space so that at least a part of the second pressurizing member 40 can be accommodated. The storage space 31 is configured as an internal space surrounded by a wall surface constituting the second container 30.

Figure 4:
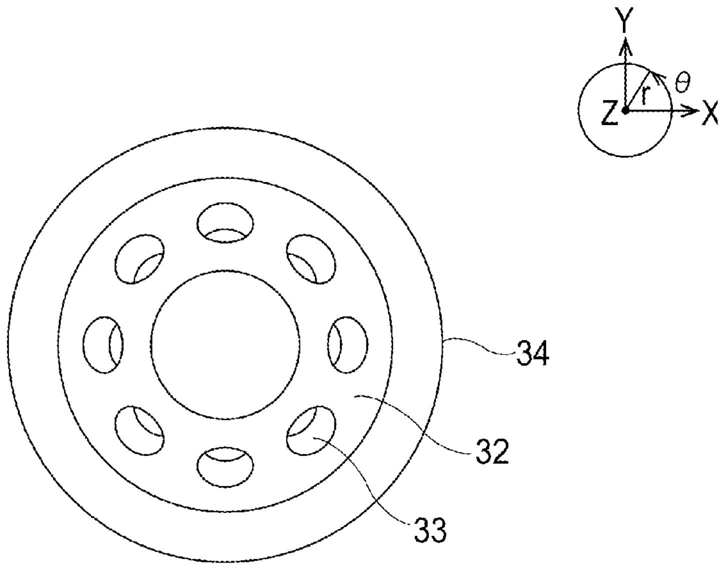
FIG. 4 is a bottom view showing the second container.

The second contact unit 32 is configured being contactable to the first contact unit 23 of the first pressurizing member 20. The second contact unit 32 is configured being inclined to the mounting surface M like an inclination unit having its cross section increasing as being apart from the first pressurizing member 20 in the height direction Z of the storage space 31 similarly to the first contact unit 23 of the first pressurizing member 20 in the state in which the applying device 100 is mounted on the mounting surface M. The second container 30 is configured to have a rotator shape like a cylinder in the present embodiment, and the second passage 33 is provided in a plurality of units along the circumferential direction θ in the second contact unit 32 as shown in FIG. 4. However, as long as the viscous material S from the first container 10 can be circulated on the pump 50 side through the second passage 33, the shapes, numbers, disposition forms, disposition spacing, and the like of the second passage 33 are not limited to those in FIG. 4.

Figure 3:
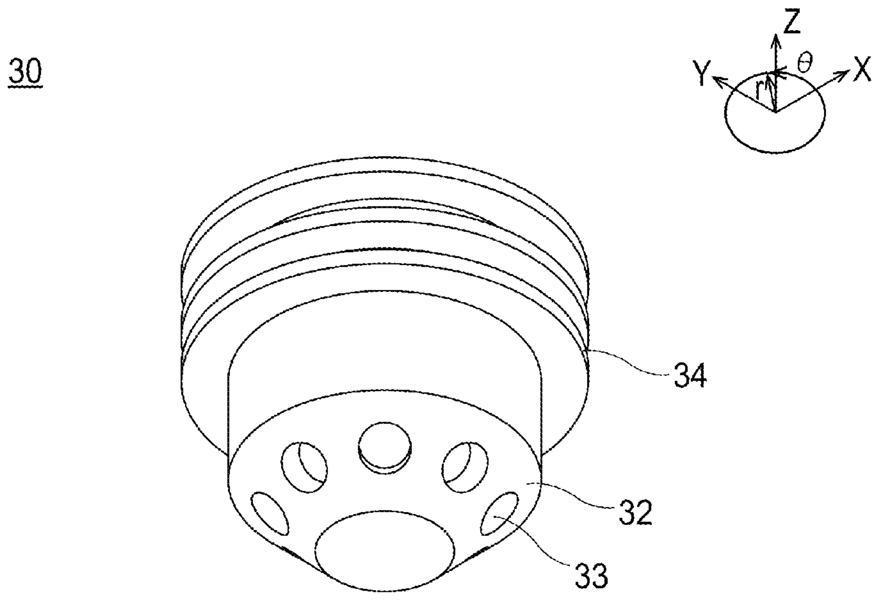
FIG. 3 is a perspective view showing a second container constituting an assembly when viewed from below.

The second passage 33 is provided on the second contact unit 32. The second passage 33 is interrupted from the first passage 24 when the first contact unit 23 is brought into contact with the second contact unit 32, and communicates with the first passage 24 when the first contact unit 23 is separated from the second contact unit 32. As shown in FIGS. 3 and 4, in the present embodiment, the second passage 33 is configured being provided in a plurality of those with a cross section in a circular shape along the circumferential direction θ of the second contact unit 32. However, as long as a predetermined amount of the viscous material S can be circulated from the first container 10 to the second container 30 when the first contact unit 23 is separated from the second contact unit 32, the cross sectional forms, numbers, disposition forms, or the like of the second passage 33 are not limited to those in FIGS. 3 and 4.

Figure 7:
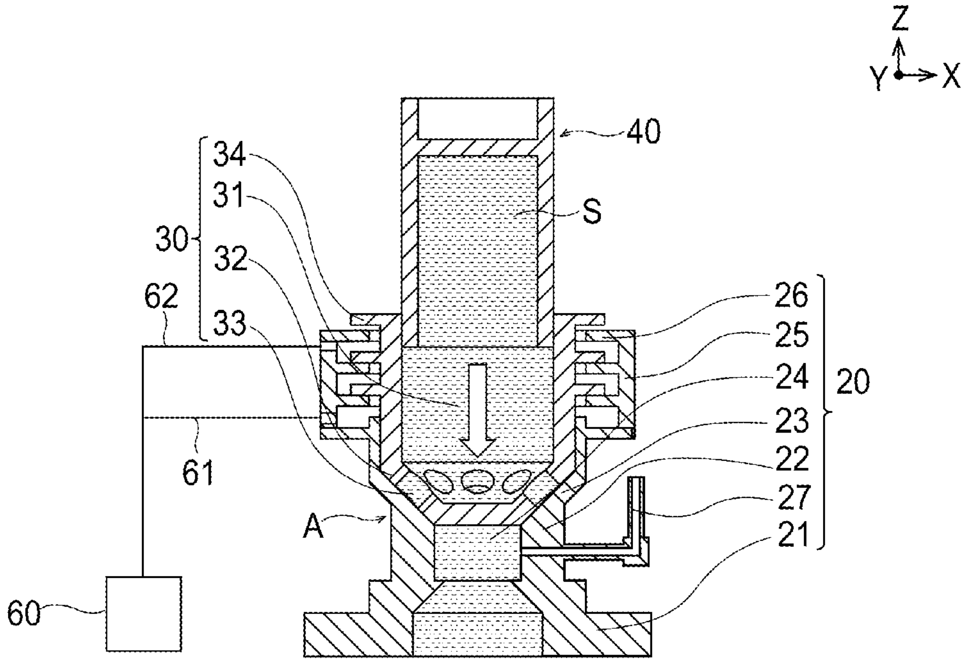
FIG. 7 is a view showing a state in which the second container is brought into contact with the first pressurizing member and the circulation of the material from the first container to the second container is interrupted.
Figure 8:
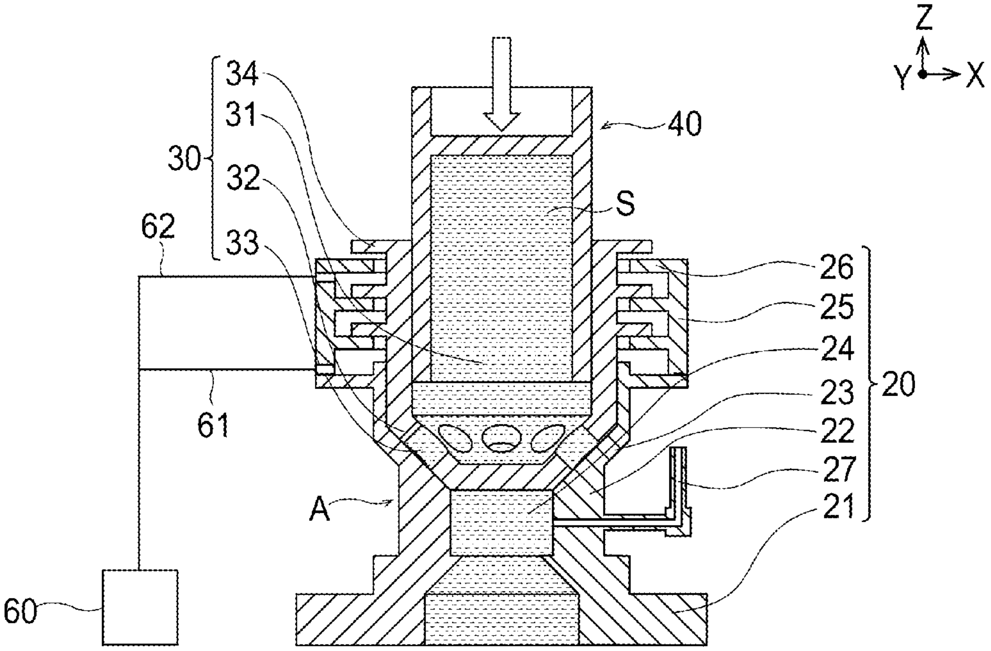
FIG. 8 is a view showing an occasion when the material in the second container is circulated to the dispenser by a second pressurizing member in the state in which the second container is in contact with the first pressurizing member.

As shown in FIGS. 7 and 8, the second contact unit 32 of the second container 30 is brought into contact with the first contact unit 23 of the first pressurizing member 20 to interrupt the circulation of the viscous material S from the first passage 24 of the first container 10 to the second passage 33 of the second container 30.

Figure 9:
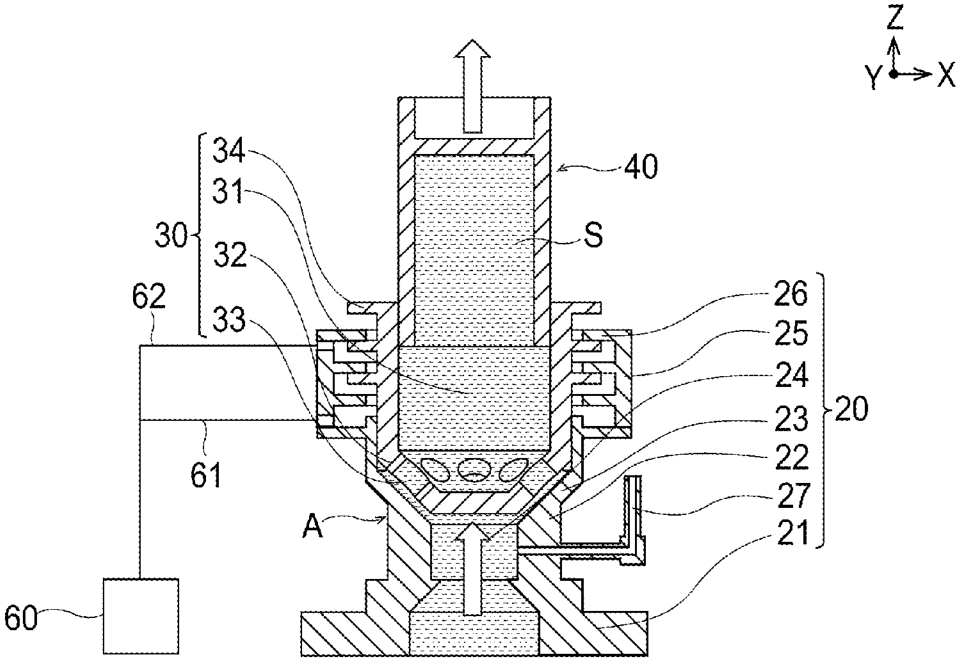
FIG. 9 is a view showing an occasion when after the material is charged in the first container, the first pressurizing member is separated from the second container, and the material in the first container is circulated to the dispenser through the second container.

On the contrary, as shown in FIGS. 6 and 9, the second contact unit 32 of the second container 30 is separated from the first contact unit 23 of the first pressurizing member 20, and the viscous material S circulates through the first passage 24 between the second contact unit 32 and the first contact unit 23 having been separated. Thus, the viscous material S circulates from the first passage 24 to the second passage 33, and further can flow into the storage space 31. In this manner, by the bringing into contact and separation of the first contact unit 23 and the second contact unit 32, the circulation and interruption of the viscous material S from the first container 10 to the second container 30 side is switched. That is, the first pressurizing member 20 and the second container 30 constituting the assembly A serve a function like a valve on the passage from the first container 10 to the second container 30 by the bringing into contact and separation of the first contact unit 23 and the second contact unit 32.

As shown in FIG. 6, the fourth contact unit 34 is configured being contactable to the third contact unit 26 of the first pressurizing member 20. The fourth contact unit 34 is provided in a plurality of units in the height direction Z corresponding to the third contact unit 26 of the first pressurizing member 20. The range in which the second container 30 moves is defined by the spacing between the adjacent fourth contact units 34.

(Second Pressurizing Member)

The second pressurizing member 40 is configured in which the viscous material S stored in the second container 30 can be pressurized. The second pressurizing member 40 is provided with a circulation port (not shown in the drawing) through which the storage space 31, described later, of the second container 30 is circulatable to the downstream of the pump 50 and the dispenser 90 and the like. Similarly to the pressurizing unit 21 of the first pressurizing member 20, the second pressurizing member 40 is configured in which the sealing member is provided on the boundary of the second container 30 to allow the storage space 31 to fluid-tightly slide. As shown in FIGS. 7 and 8, the second pressurizing member 40 is configured moving from above to below to cause the viscous material S stored in the storage space 31 of the second container 30 to circulate by extruding the viscous material S toward the pump 50 and the dispenser 90 on the downstream.

(Pump)

The pump 50 causes the viscous material S from the second container 30 to circulate toward the dispenser 90. The pump 50 includes a suction port (not shown in the drawing) that sucks the viscous material S from the second container 30, a pump camber (not shown in the drawing), and a discharge port (not shown in the drawing). The specific configuration of the pump 50 is not limited specifically as long as the viscous material S sucked through the suction port can be discharged from the discharge port toward the dispenser 90. As the pump 50, gear pumps, plunger pumps, screw pumps, piston pumps, and the like can be applied.

(First Drive Unit)

The first drive unit 60 imparts driving force that causes the second container 30 to relatively approach and separate with respect to the first pressurizing member 20 to the second container 30. In the present embodiment, as shown in FIGS. 6 to 9, the first drive unit 60 has the supply ports 61 and 62 for air pressure. The supply port 61 is connected to the lower side on the external wall 25 of the first pressurizing member 20. The supply port 62 is connected to the upper side on the external wall 25 of the first pressurizing member 20. The first drive unit 60 is configured so as to change the relative position between the first pressurizing member 20 and the second container 30 by selecting the supply destination of the air from any one of the supply ports 61 and 62.

That is, when air is supplied from the first drive unit 60 to the supply port 61, the second container 30 receives thrust moving upward in the height direction Z and ascends. Thus, the first contact unit 23 of the first pressurizing member 20 and the second contact unit of the second container 30 are brought into a separated state. As a result, the viscous material S stored in the storage space 11 of the first container 10 is circulatable to the storage space 31 of the second container 30 through the first passage 24 and the second passage 33.

On the contrary, when air is supplied from the first drive unit 60 to the supply port 62, thrust moving the second container 30 downward, reverse to the description above, is imparted to bring the first contact unit 23 of the first pressurizing member 20 into contact with the second contact unit 32 of the second container 30. Thus, the viscous material S stored in the storage space 11 of the first container 10 is brought into a state in which no circulation is allowed to the storage space 31 of the second container 30.

In the present embodiment, as described above, the first drive unit 60 is configured moving the second container 30 by switching the supply destination of the air pressure. However, the specific configuration of the first drive unit 60 is not limited to the description above as long as the relative position between the first pressurizing member 20 and the second container 30 can be changed, and configurations may be possible in which the positional relationship between both is changed by oil pressure, or the positional relationship between both is switched electromagnetically (by a solenoid valve).

(Second Drive Unit)

The second drive unit 70 causes the first pressurizing member 20 relatively move to the first container 10. As shown in FIG. 2, the second drive unit includes a fixed rod 71 and an extendable and contractible operating rod 72. In the second drive unit 70, the fixed rod 71 is installed on the mounting surface M. The operating rod 72 of the second drive unit 70 is movably attached to the fixed rod 71. Furthermore, the operating rod 72 is connected to an upper attaching unit F that attaches the third drive unit 80 connected to the pump 50 and the first pressurizing member 20. Thus, the second drive unit 70 imparts driving force relatively moving the first pressurizing member 20 to the first container 10 through the upper attaching unit F and the third drive unit 80 to the first pressurizing member 20.

(Third Drive Unit)

The third drive unit 80 causes the second pressurizing member 40 to relatively move to the second container 30. As shown in FIG. 2, the third drive unit 80 includes a fixed rod 81 and an operating rod 82. The fixed rod 81 is connected to the upper attaching unit F. The operating rod 82 is movably attached to the fixed rod 81. Furthermore, the operating rod 82 is connected to the first pressurizing member 20. Thus, the third drive unit 80 imparts driving force relatively moving the second container 30 to the second pressurizing member 40 to the second container 30 through the first pressurizing member 20. Note that although the second drive unit 70 and the third drive unit 80 are configured such that the operating rod is driven by air pressure similarly to the first drive unit 60, the second drive unit 70 and the third drive unit 80 are not limited to the description above. The second drive unit 70 and the third drive unit 80 may be configured performing driving the operating rod by oil pressure or performing driving the operating rod electromagnetically.

(Dispenser)

The dispenser 90 is connected to the discharge port of the pump 50. The dispenser 90 discharges the viscous material S stored in the first container 10 and the second container 30 and discharged from the pump 50, to a predetermined position. The dispenser 90 is provided with a valve that adjusts charging and discharging the viscous material S delivers from the pump 50.

Use Examples

Figure 5:
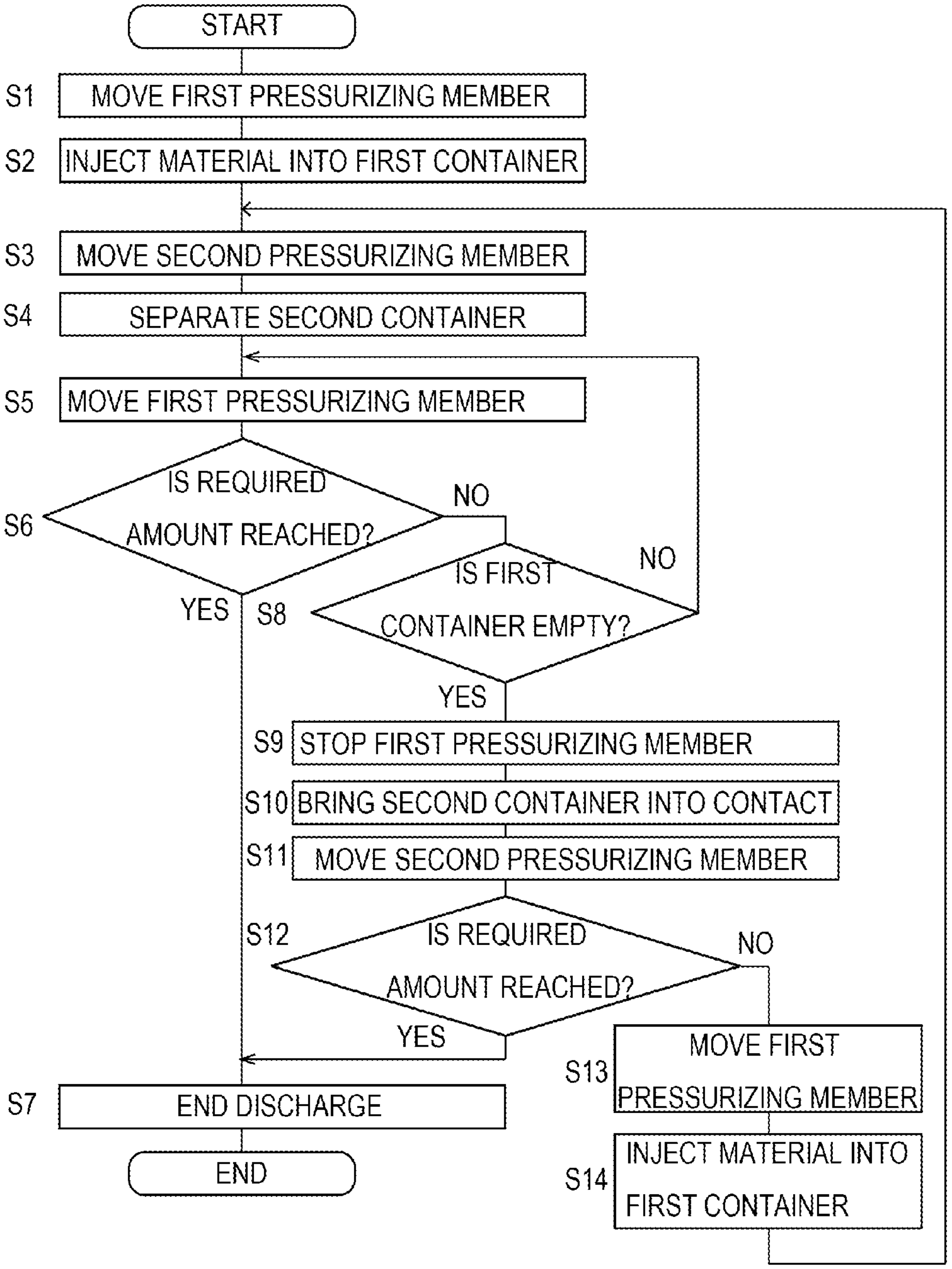
FIG. 5 is a flowchart showing a method for using the assembly and the applying device.

Next, use examples of the applying device 100 according to the present embodiment will be described. FIG. 5 is a flowchart showing use examples of the applying device 100 according to the present embodiment. Summarizing use examples of the applying device 100, the first contact unit 23 of the first pressurizing member and is separated from the second contact unit 32 of the second container 30 by the first drive unit 60 (S4). Then, the viscous material S stored in the first container 10 is moved to the second container 30, and discharged from the dispenser 90 (S5). When the viscous material S in the first container 10 becomes empty, the first contact unit 23 of the first pressurizing member 20 is brought into contact with the second contact unit 32 of the second container 30 (S10), and the viscous material S charged in the second container 30 is discharged from the dispenser 90 (S11). In the following, the detail will be described.

First, the second drive unit 70 is operated, the first pressurizing member 20 is moved upward to the first container 10 for separation (ascent) (S1). When the first pressurizing member 20 is brought into a state in which the storage space 11 of the first container 10 is uncovered, the viscous material S is then injected into the storage space 11 of the first container 10, the second drive unit 70 lowers the first pressurizing member 20 from the upper side approaching the first container 10, and makes the storage space 11 an enclosed space (S2).

Next, operating the third drive unit 80 and moving the second pressurizing member 40 upward make the viscous material S into a state storable in the storage space 31 of the second container 30 (S3). Then, the first drive unit 60 is operated, air is supplied to the supply port 61, and as shown in FIG. 6, a separated state is achieved in which the second contact unit 32 of the second container 30 is separated from the first contact unit 23 of the first pressurizing member 20 (S4).

In this state, the second drive unit 70 is operated to lower the first pressurizing member 20, and the storage space 11 of the first container 10 is reduced for pressurization (S5). Here, the first contact unit 23 of the first pressurizing member 20 is separated from the second contact unit 32 of the second container 30 as shown in FIG. 6. Therefore, the viscous material S can enter the second passage 33 of the second container 30 through the first passage 24. Thus, the viscous material S passes the first passage 24 of the first pressurizing member 20 and the second passage 33 of the second container 30 from the storage space 11 of the first container 10, and flows into the storage space 31. The viscous material S having flowed into the storage space 31 of the second container 30 is sucked by the pump 50, and is turned into a dischargeable state from the dispenser 90.

When the amount of the viscous material S being discharged using the first pressurizing member 20 reaches a predetermined requested amount (S6: YES), the second drive unit 70 stops the movement of the first pressurizing member 20, and discharging the viscous material S is ended (S7).

The discharge amount of the viscous material S does not reach the requested amount (S6: NO), and when the viscous material S in the storage space 11 is not empty or is not nearly empty such that discharge is not possible from the storage space 11 (S8: NO), discharging the viscous material S by the first pressurizing member 20 is continued (S5).

The discharge amount of the viscous material S does not reach the requested amount (S6: NO), and when the viscous material S in the storage space 11 is empty or is nearly empty such that discharge is not enabled from the storage space 11 (S8: YES), the operation of the second drive unit 70 is stopped. Thus, the movement of the first pressurizing member 20 is stopped (S9). Then, the first drive unit 60 is operated to switch the supply destination of air to the supply port 62, and the second contact unit 32 of the second container 30 is brought into contact with the first contact unit 23 of the first pressurizing member 20 (S10). Thus, the supply of the viscous material S from the storage space 11 of the first container 10 to the storage space 31 of the second container 30 is stopped.

As soon as bringing the second contact unit 32 of the second container 30 into contact with the first contact unit 23 of the first pressurizing member 20, the third drive unit 80 causes the second pressurizing member 40 to move downward (S11). Thus, a state is achieved in which the viscous material S is dischargeable from the storage space 31 of the second container 30 to the dispenser 90, not long after the supply of the viscous material S from the first container 10 is interrupted.

When the amount of the viscous material S from the storage space 31 of the second container 30 being discharged using the second pressurizing member 40 reaches the requested amount (S12: YES), the third drive unit 80 stops the movement of the second pressurizing member 40, and discharge is ended (S7).

In the case in which the discharge amount does not reach the requested amount by discharging the viscous material S from the second container 30 using the second pressurizing member 40 (S12: NO), the first pressurizing member 20 is moved so as to separate from the first container 10 while the viscous material S is being discharged using the second pressurizing member 40 (S13). Then, the viscous material S is injected (replenished) into the storage space 11 in an unenclosed state in the first container 10 in an empty state or a nearly empty state to the degree in which discharge is difficult (S14).

After that, as described above, the third drive unit 80 moves the second pressurizing member 40 to separate with respect to the second container 30 (S3), the first drive unit 60 causes the second contact unit 32 of the second container 30 to separate from the first contact unit 23 of the first pressurizing member 20 (S4). Then, the second drive unit 70 causes the first pressurizing member 20 to operate to supply the viscous material S from the storage space 11 of the first container 10 to the dispenser 90 through the storage space 31 of the second container 30 (S5). When the discharge amount of the viscous material S reaches the requested amount (S6: YES), the second drive unit 70 stops the movement of the first pressurizing member 20, and discharging the viscous material S is stopped (S7).

As described above, the assembly A of the applying device 100 according to the present embodiment has the first pressurizing member 20 and the second container 30. The first pressurizing member 20 is configured in which the viscous material S stored in the first container 10 can be pressurized. The second container 30 is configured storing the viscous material S and being relatively approachable and separatable with respect to the first pressurizing member 20. The first pressurizing member 20 includes the first contact unit 23 contactable with the second container 30 and the first passage 24 through which the viscous material S stored in the first container 10 can be circulated to the second container 30. The second container 30 includes the second contact unit 32 and the second passage 33. The second contact unit 32 is provided contactably with the first contact unit 23. The second passage 33 is interrupted from the first passage 24 when the first contact unit 23 is brought into contact with the second contact unit 32, and communicates with the first passage 24 when the first contact unit 23 is separated from the second contact unit 32.

In this manner, by providing the second passage 33 on the second container 30, and bringing the first contact unit 23 of the first pressurizing member 20 into contact with the second contact unit 32 of the second container 30 or separating the first contact unit 23 of the first pressurizing member 20 from the second contact unit 32 of the second container 30, the assembly A can be provided with a function as a valve. Thus, the circulation and interruption of the viscous material S can be switched between the first container 10 and the second container 30 using the assembly A. Furthermore, the assembly A is configured as described above, and thus the applying device 100 can be made compact compared with the case in which a valve is separately installed.

Furthermore, the first pressurizing member 20 and the second container 30 are configured being approachable and separatable in the height direction Z that is the vertical direction in the state in which the applying device 100 is mounted on the horizontal plane. Therefore, even when the second container 30 is operated, there is no necessity of reserving the moving space of the second container 30 in the horizontal direction, and thus the space saving can be achieved in the horizontal direction.

Furthermore, the first contact unit 23 and the second contact unit 32 are configured being inclined to the mounting surface M of the applying device 100 in the state in which the applying device 100 is mounted. Thus, spaces necessary to the height direction Z corresponding to the vertical direction and the planar direction XY can be distributed, and space saving can be efficiently achieved.

Furthermore, a plurality of the second passages 33 are provided in the second contact unit 32. Thus, the viscous material S circulating from the first pressurizing member 20 can be efficiently circulated to the downstream side including the dispenser 90 and the like.

Furthermore, in the method for using the assembly, the first contact unit 23 is brought into contact with the second contact unit 32 to interrupt the circulation of the viscous material S from the first passage 24 to the second passage 33. Then, the first contact unit 23 is separated from the second contact unit 32 to circulate the viscous material S from the first passage 24 to the second passage 33. Such an operation in which the bringing into contact and separation of the first contact unit 23 and the second contact unit 32 enables simple implementation of the circulation and interruption of the viscous material S.

Furthermore, the applying device 100 according to the present embodiment has the first drive unit 60 that relatively approaches and separates the second container with respect to the first pressurizing member 20 and the dispenser 90 that can discharge the viscous material S stored in the first container 10 and the second container 30. Thus, the approach and separation of the first pressurizing member 20 and the second container 30 can be enabled in the applying device 100, and space saving can be achieved as the applying device 100.

Furthermore, the applying device 100 further has the second pressurizing member 40 that can pressurize the viscous material S stored in the second container 30. Therefore, even in the case in which it is difficult to supply the viscous material S from the storage space 11 of the first container 10, the viscous material S can be supplied from the storage space 31 of the second container 30.

Furthermore, the applying device 100 includes the second drive unit 70 that causes the first pressurizing member 20 to relatively move to the first container 10 and the third drive unit 80 that causes the second pressurizing member 40 to relatively move to the second container 30. Thus, the viscous material S can be supplied from a plurality of supply sources, the first container 10 and the second container 30, and the viscous material S can be supplied from the second container 30 even though during the injection of the viscous material S into the first container 10.

Furthermore, the use of the applying device 100 is configured in which the second container 30 is relatively separated from the first pressurizing member 20 by the first drive unit 60, and the viscous material S stored in the first container 10 is moved to the second container 30, and discharged from the dispenser 90. In this manner, moving the second container 30 to the first pressurizing member 20 enables the assembly A to have a function as a valve, and the space saving of the applying device 100 can be achieved.

Furthermore, the method for using the applying device 100 is configured in which the viscous material S is injected into the first container 10 while the viscous material S stored in the second container 30 is supplied to the dispenser 90 using the second pressurizing member 40. Thus, even in the case in which the viscous material S temporarily becomes empty in the storage space 11 of the first container 10 or becomes nearly empty, the time lag for which the viscous material S is not supplied to the dispenser 90 can be eliminated or the time lag can be brought to nearly zero.

Note that the present invention is not limited only to the above embodiment, and can be variously modified in claims. In the description above, the description is made that the first passage 24 of the first pressurizing member 20 includes a part at which the cross sectional area is changed and a part at which the cross section is constant from the first container 10 side to the second container 30. However, the passage of the first pressurizing member 20 may be configured only by a part at which the cross section is changed other than the description above. Furthermore, in the description above, the embodiment in which the applying device 100 has the pump 50 is described. However, as long as the passage length from the first container 10 to the dispenser 90 is short, a configuration with no pump 50 is also included in an embodiment of the present invention.

Note that the present application is based on Japanese Patent Application No. 2018-214040 filed on Nov. 14, 2018, the content of which is hereby incorporated as its entirety by reference.

REFERENCE SIGNS LIST

10 First container
20 First pressurizing member
23 First contact unit
24 First passage
30 Second container
32 Second contact unit
33 Second passage
40 Second pressurizing member
60 First drive unit
70 Second drive unit
80 Third drive unit
90 Dispenser (Discharging unit)
100 Applying device
A Assembly
M Mounting surface
S Viscous material.

The invention claimed is:

1. An assembly used for an applying device having a first pressurizing member enabling pressurization of a viscous material stored in a first container and a second container having the material stored, the viscous material having a viscosity of 20 to 1,000 Pa·s, and the second container being relatively approachable and separatable with respect to the first pressurizing member, wherein the first pressurizing member includes a first contact unit contactable with the second container and a first passage through which the material stored in the first container is circulatable to the second container, and the second container includes a second contact unit contactable with the first contact unit, and a second passage provided on the second contact unit, the second passage being interrupted from the first passage when the first contact unit is brought into contact with the second contact unit, the second passage communicating with the first passage when the first contact unit is separated from the second contact unit.

2. The assembly according to claim 1, wherein the first pressurizing member and the second container are approachable and separatable in a vertical direction in a state in which the applying device is mounted on a horizontal plane.

3. The assembly according to claim 1, wherein the first contact unit and the second contact unit are not at right angles to a vertical plane in a state in which the applying device is mounted.

4. The assembly according to claim 1, wherein a plurality of the second passages are provided in the second contact unit.

5. A method for using an assembly, the method comprising:

bringing the first contact unit into contact with the second contact unit according to claim 1 to interrupt circulation of the material from the first passage to the second passage; and separating the first contact unit from the second contact unit to circulate the material from the first passage to the second passage.

6. An applying device comprising:

a first drive unit relatively approaching and separating the second container with respect to the first pressurizing member in the assembly according to claim 1; and a discharging unit enabling discharging the material stored in the first container and the second container.

7. The applying device according to claim 6, further comprising a second pressurizing member enabling pressurization of the material stored in the second container.

8. The applying device according to claim 7, further comprising:

a second drive unit causing the first pressurizing member to relatively move to the first container; and a third drive unit causing the second pressurizing member to relatively move to the second container.

9. A method for replenishing a material comprising replenishing the material in the first container while the material stored in the second container is supplied to the discharging unit using the second pressurizing member according to claim 7.

10. A method for using an applying device comprising:

relatively separating the second container to the first pressurizing member by the first drive unit according to claim 6, and moving the material stored in the first container in the second container to discharge the material from the discharging unit.

* * * * *